UNITED STATES PATENT OFFICE.

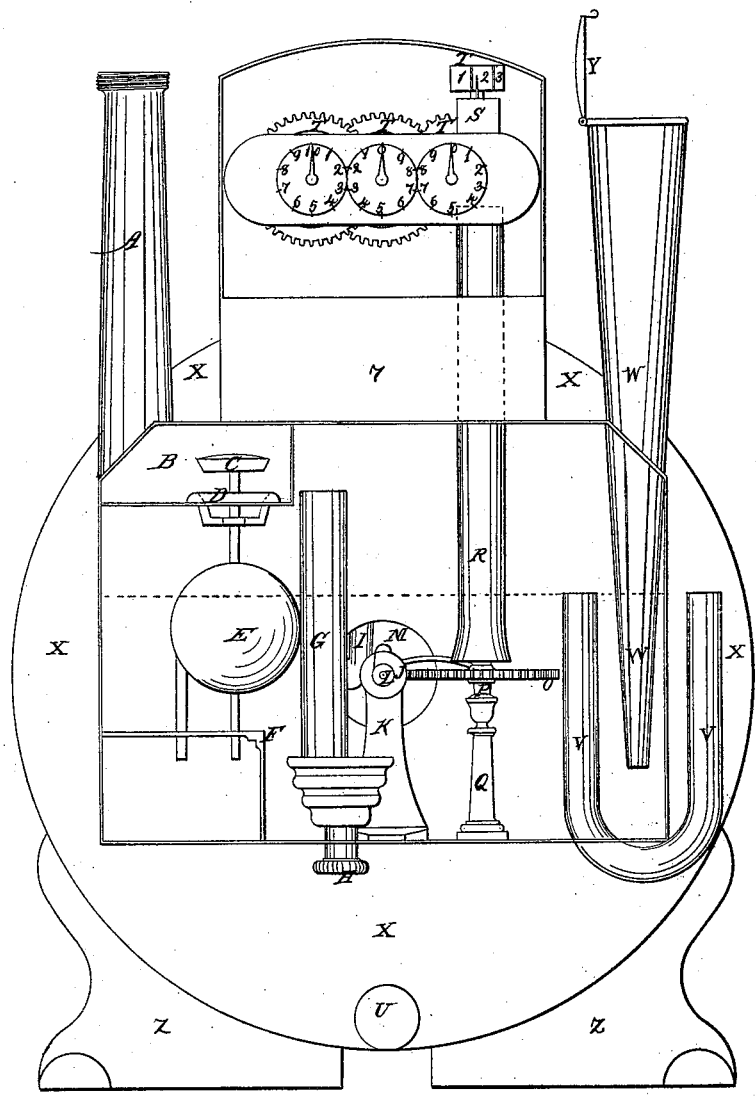

GILE J. WILLSON AND DAVID H. FOX, OF READING, PENNSYLVANIA.

IMPROVEMENT IN GAS-METERS.

Specification forming part of Letters Patent No. 29,740, dated August 21, 1860.

*To all whom it may concern:*

Be it known that we, GILE J. WILLSON and DAVID H. FOX, of the city of Reading, county of Berks, and State of Pennsylvania, have invented certain new and useful Improvements in Wet Gas-Meters; and we do hereby declare that the following is a full and exact description thereof, reference being had to the accompanying drawings, and to the letters and figure of reference marked thereon, in which the accompanying drawings are an elevated front view of three-fourths the size of a three-light wet gas-meter.

A is the inlet-tube to the meter.

B is a gas-chamber.

C is a metal valve.

D is a seat for valve C.

E is a float, which is raised by the water in meter, which is intended to stand at the level of the red dotted line across the meter.

F is a guide or steady-bearing, through which the steady-pins to the bottom of float E pass to keep it in its proper place or position.

G is the dry-well tube, through which the gas passes to inlet-tube.

H is a thumb-screw in the bottom of dry well.

I is the inlet-tube, which passes the gas into the center of measuring-drum.

J is a screw-wheel on drum-shaft L.

K is a stand with a bearing in the upper end for drum-shaft L.

L is the end of drum-shaft.

M is the center of measuring-drum.

O is a gear-wheel geared into screw-wheel J.

P is an upright shaft, on which gear-wheel O is secured, passing through tube R to connect with registering-dials.

Q is a stand or bearer for upright shaft P.

R is a metal tube, through which shaft P passes to its upper bearing, S.

T T T T is registering-gearing connected to upright shaft P by a screw-wheel on shaft P, just below its bearing at S.

U is an outlet-screw to draw off water in emptying out meter.

V is an upright inverted-siphon-shaped tube, with one end open in the water-chamber of a meter at the water-level, the other or outer end of tube at about the same level on the outside of the meter to permit an outlet of water from the water-chamber without taking out screws, thereby regulating the level of the water so that it cannot rise to overflow the dry-well tube G either in filling meter or by condensation in pipes through buildings where gas is used.

W is a filling-tube through which water is passed in filling meter with water.

Y is a lid to filling-tube.

X X X X X is a view of the front of the case of the measuring-drum.

Z Z is the base of meter.

7 represents the front of the case of the registering-dials with the lid off.

We do not claim anything connected with the gearing, measuring-drum, or registering arrangement of a wet gas-meter, as described; but What we do claim, and desire to secure by Letters Patent as our invention and application, is—

1. The application of tube V, of any convenient length, size, shape, or form, and located at any convenient place in or on the meter, with one end open inside of the meter at or about the working water-level of a wet gas-meter, with the other or outer end open or closed by a screw or otherwise at or about the water-level of the meter.

2. The application and combination, with tube V and the other general arrangement of a wet gas-meter, of a filling-tube, W, of any convenient size, shape, or form, with the lower end passing below the water-level of the meter and the upper end passing high enough to overcome the pressure of gas in the meter to prevent an overflow of water, with an open filling-tube also to admit of water being filled into the meter without turning off the gas.

GILE J. WILLSON.
DAVID H. FOX.

Witnesses:
 WM. THEEN,
 GEORGE PRINTZ.